United States Patent
Hjortshoj

(10) Patent No.: US 9,262,414 B1
(45) Date of Patent: Feb. 16, 2016

(54) DETECTING TIME ZONES USING HISTORICAL DATE SAMPLING

(71) Applicant: Julian M. Hjortshoj, Boston, MA (US)

(72) Inventor: Julian M. Hjortshoj, Boston, MA (US)

(73) Assignee: EMC Corporation, Hopkinton, MA (US)

( * ) Notice: Subject to any disclaimer, the term of this patent is extended or adjusted under 35 U.S.C. 154(b) by 645 days.

(21) Appl. No.: 13/630,943

(22) Filed: Sep. 28, 2012

(51) Int. Cl.
*G06F 15/16* (2006.01)
*G06F 17/30* (2006.01)
*G04G 9/00* (2006.01)
*G06Q 10/10* (2012.01)

(52) U.S. Cl.
CPC ............ *G06F 17/30* (2013.01); *G04G 9/0076* (2013.01); *G06Q 10/109* (2013.01)

(58) Field of Classification Search
CPC ............... G06F 9/46; G06F 17/30569; G06F 17/30076; G06F 17/30
USPC .................................. 709/203; 707/723, 746
See application file for complete search history.

(56) References Cited

U.S. PATENT DOCUMENTS

| | | | |
|---|---|---|---|
| 6,643,664 B1* | 11/2003 | Yaung | 707/809 |
| 7,852,711 B1* | 12/2010 | Fitzgerald et al. | 368/21 |
| 7,948,832 B1* | 5/2011 | Luo et al. | 368/21 |
| 2005/0192961 A1* | 9/2005 | Dittrich et al. | 707/7 |
| 2006/0059173 A1* | 3/2006 | Hirsch et al. | 707/100 |
| 2007/0121425 A1* | 5/2007 | Eble et al. | 368/21 |
| 2007/0201311 A1* | 8/2007 | Olson | 368/29 |
| 2008/0032736 A1* | 2/2008 | Bari et al. | 455/552.1 |
| 2009/0193048 A1* | 7/2009 | Nalla et al. | 707/102 |
| 2011/0164472 A1* | 7/2011 | Arena | 368/13 |
| 2011/0218988 A1* | 9/2011 | Rhoten | 707/723 |
| 2013/0013617 A1* | 1/2013 | Cai et al. | 707/746 |
| 2013/0074148 A1* | 3/2013 | Van Megchelen | 726/2 |

OTHER PUBLICATIONS

Wikipedia—Collections, Hash tables, Associative arrays (incl. Programming language support).*
Scott Watermasysk, Improving Automated Timezone Detection, Sep. 6, 2011 http://dev.scottw.com/automated-timezone-detection.*
(detect-timezone.js (Fraser & Nylander—Sep. 4, 2011) <https://github.com/scottwater/jquery.detecttimezone/commit/ . . . >.*
Mark Gearhart, Handling Time Zones and Daylight Savings Time, Spring 2011.*
Bill Seymour, A Relational View of the tz Database Version 2.6, Jun. 17, 2011.*
Josh Fraser, Auto detect a time zone with Java Script, onlineaspect.com, 2007.

* cited by examiner

*Primary Examiner* — David Lazaro
*Assistant Examiner* — Robert Shaw
(74) *Attorney, Agent, or Firm* — Van Pelt, Yi & James LLP

(57) ABSTRACT

Detecting time zones using historical date sampling is disclosed. In various embodiments, an offset between a system time and a reference time is determined for each of a plurality of sample points, to produce a resulting set of offsets. A representation of the set of offsets is computed. The representation of the set of offsets is used as a key to look up a time zone associated with the system.

16 Claims, 4 Drawing Sheets

DETECTING TIME ZONES USING HISTORICAL DATE SAMPLING

BACKGROUND OF THE INVENTION

JavaScript lacks an API to fetch the time zone setting of the user's operating system. Often, when developing web applications, it is desirable to know the user time zone so that server code can accurately adjust UTC dates into the user's local time when passing data or rendered html back to the browser. The most common approach to this problem is to fetch the UTC offset for the current date, and use that value to look up a time zone name in a list of time zones keyed by offset. This approach, however, fails to properly account for daylight savings time (DST) changes, and also fails to distinguish hemispheric differences in DST rules. For example, New Zealand time zones observe a daylight savings time, but do so during southern hemisphere summer (September-April). As a consequence, applications using any northern hemisphere time zone for clients in New Zealand would display inaccurate times for part of the year.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting time zones using historical date sampling is disclosed. In various embodiments, UTC offsets for a list of specific dates are fetched, for example at a server. The resulting list of offsets is used to create a hash value or other repeatable, unique representation for each time zone available to the server. The resulting table of hash values (or other representation) and for each a corresponding time zone name is passed to the client, which in various embodiments uses standard javascript APIs to create the same hash value (or other representation), based on corresponding offsets determined locally at the client, and then uses the result as a key value to look up the time zone name from the table received from the server.

Figure 1:
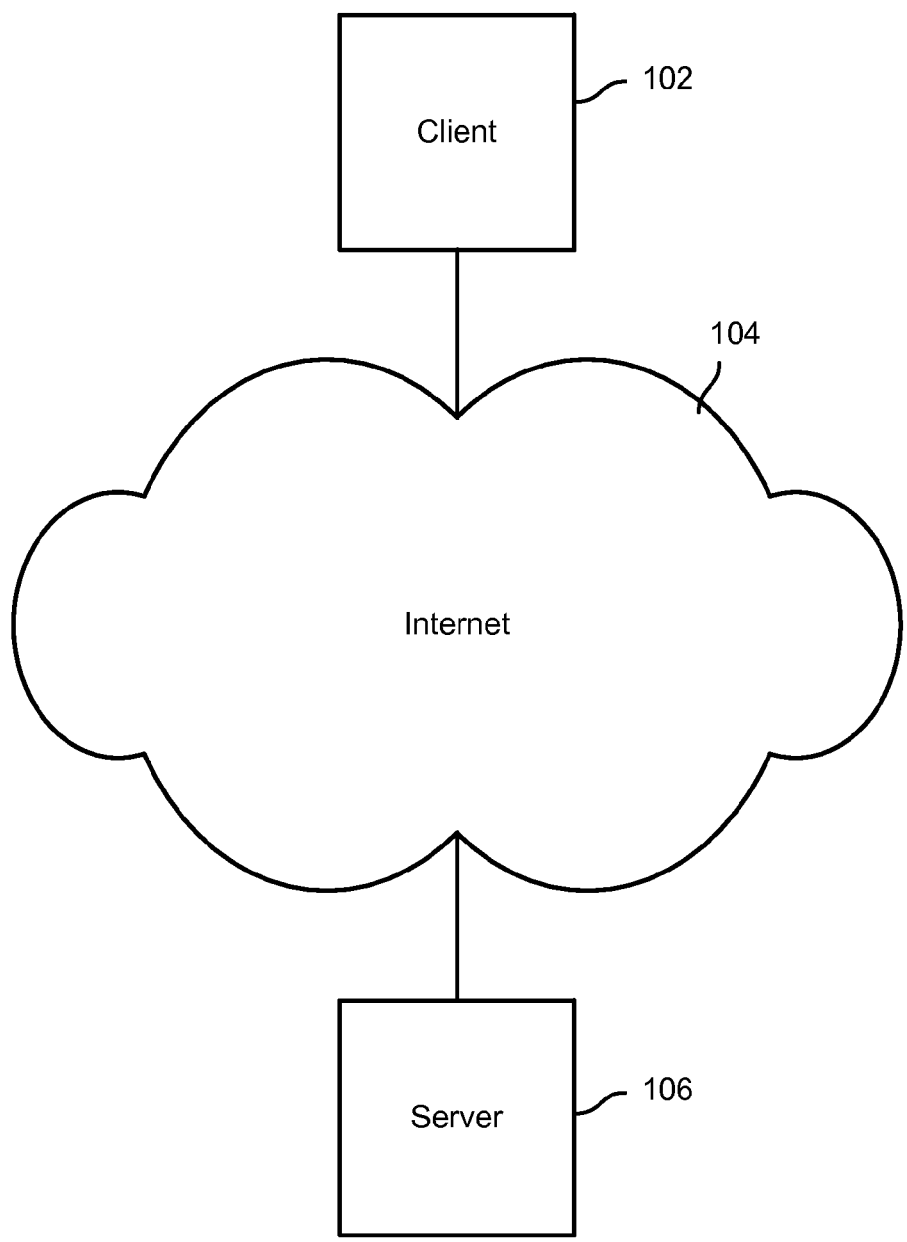
FIG. 1 is a block diagram illustrating an embodiment of a client-server environment.

FIG. 1 is a block diagram illustrating an embodiment of a client-server environment. In the example shown, one or more clients, represented in FIG. 1 by client 102, connect via the Internet (and/or one or more other networks) 104 to remote servers, such as server 106. Examples of server 106 include without limitation a Java or other application server. Server 106 provides a web-based application and/or service to clients such as client 102. For example, JavaScript or other browser-executable code may be provided to clients such as client 102 to enable web application processing to be performed at the client.

As noted above, a client (e.g., desktop computer, laptop or other portable computer, mobile phone, tablet, or other computing device) may be located anywhere in the world. Certain applications and/or features thereof may require that the server 106 know the named time zone within which the client 102 is located. Examples of cases in which such information may need to be known at the server 106 include without limitation calendar, scheduling, and other date/time specific services that may refer to and/or establish objects tied to dates and times in the past and/or future. As noted above, JavaScript does not currently provide a way to fetch the named time zone within which a client is located (or otherwise associated) and return same to the server. Even if such a mechanism were available, there would not be a guarantee that the name provided would be recognized at the server, which may for example use a different name to refer to the same or a functionally equivalent time zone.

Figure 2:
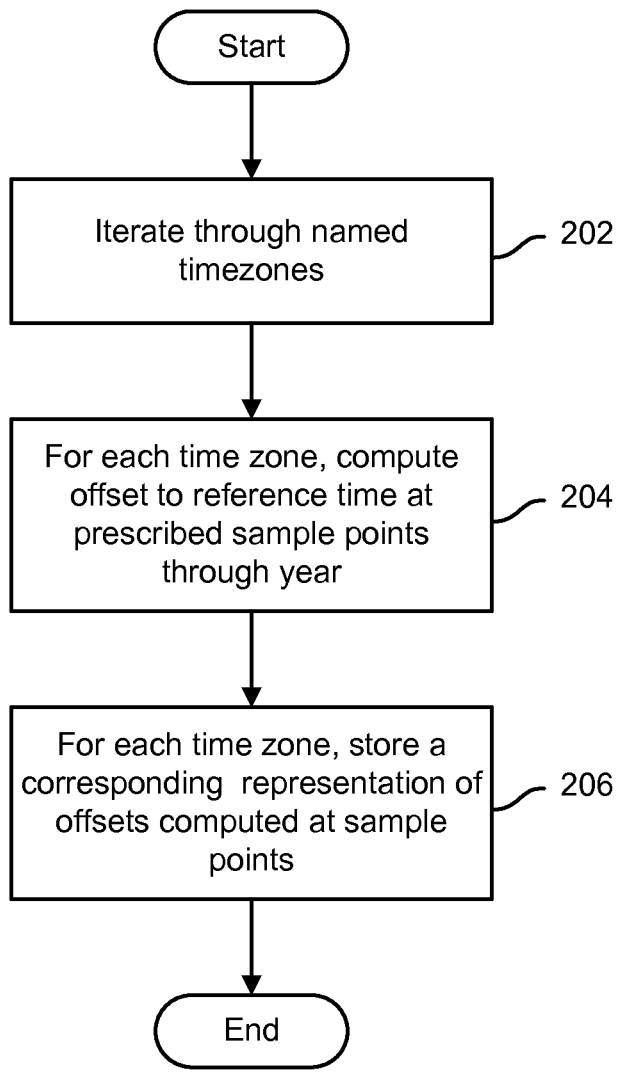
FIG. 2 is a flow chart illustrating an embodiment of process to determine a time zone.

FIG. 2 is a flow chart illustrating an embodiment of process to determine a time zone. In various embodiments, the process of FIG. 2 is implemented at a Java or other web application server. In the example shown, the server iterates through named time zones (202) and for each time zone computes an offset to a reference time, for example Coordinated Universal Time (UTC), at each of a prescribed set of sample points (204). For example, in some embodiments, offsets are computed at four sample points throughout the year (e.g., 12 noon or midnight on the summer and winter solstice and the spring and fall equinox). A hash value, or some other representative string or other value, is computed for each named time zone based on the corresponding set of computed offsets (206), and the results are stored in a lookup table or other structure that associates each representation (key) with its associated named time zone (value).

Figure 3:
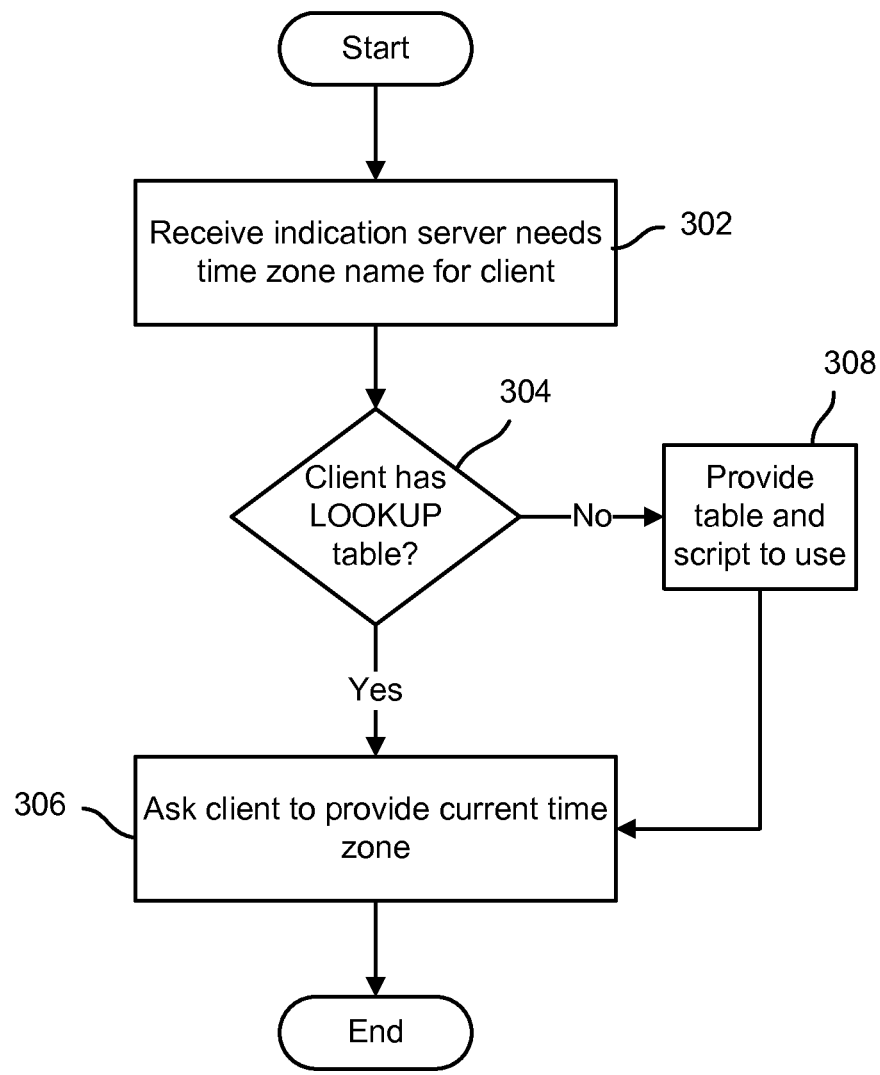
FIG. 3 is a flow chart illustrating an embodiment of process to determine a time zone.

FIG. 3 is a flow chart illustrating an embodiment of process to determine a time zone. An indication that the server (or web application code running at the client, such as JavaScript) needs to know the named time zone of the client, is received (302). It is determined whether the client stores the lookup table of computed offset set representative values (key) and associated time zones (value) (304). If the client already has the lookup table of computed offset set representative values (key) and associated time zones (value), as described in connection with step 206 above, the client is caused to use the lookup table to determine and provide the local time zone (306). For example, JavaScript at the client fetches offsets at the client for the same sample points, computes the corresponding representation, and uses the result to look up the time zone name in the lookup table. If the client does not already have the lookup table, the table is downloaded to the client (308) and used to determine and provide the time zone.

Figure 4:
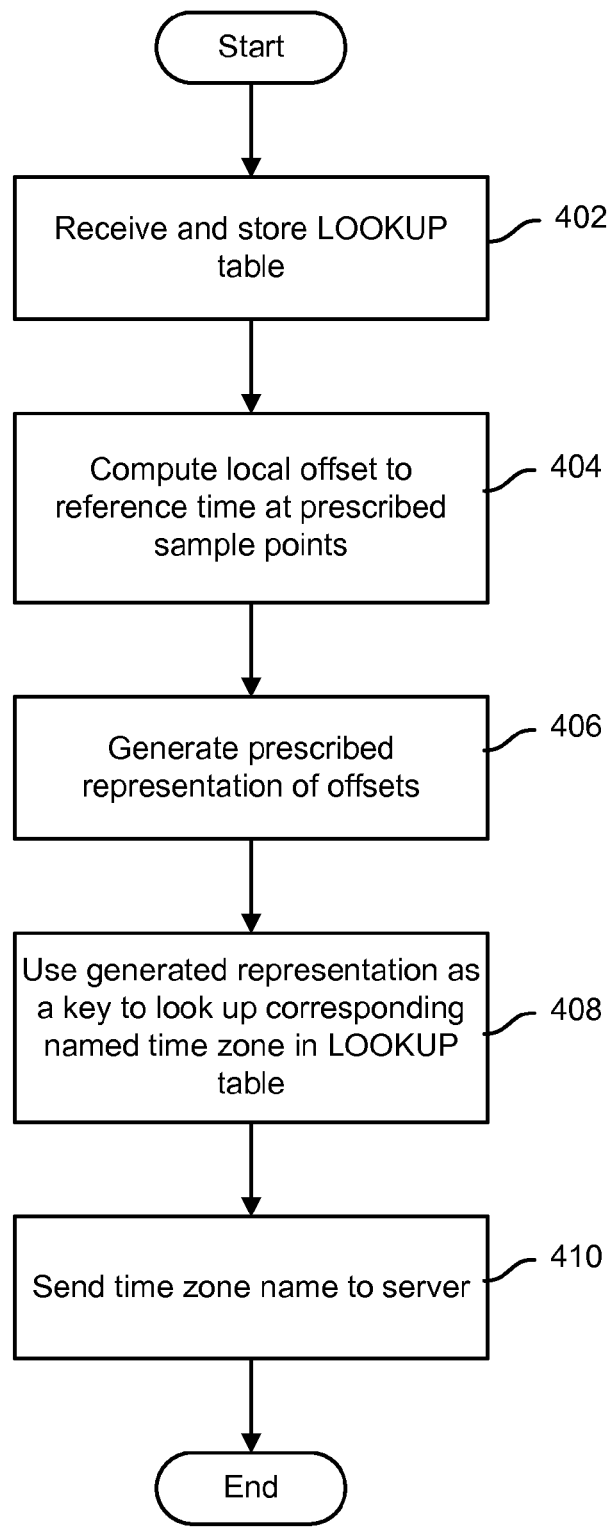
FIG. 4 is a flow chart illustrating an embodiment of process to determine a time zone.

FIG. 4 is a flow chart illustrating an embodiment of process to determine a time zone. In various embodiments, the process of FIG. 4 is implemented at a web application client, such as client 102 of FIG. 1, e.g., by receiving and executing associated JavaScript or other code at the client. In the example shown, a lookup table of computed offset set representative values (key) and associated time zones (value), as described in connection with step 206 above, is received and stored (402). A local offset to a reference time (e.g., UTC) at each sample point in a prescribed set of sample points is determined (404). A prescribed representation (e.g., hash value, concatenated string) of the resulting offsets is generated (406) and used as a key to look up a corresponding time zone in the lookup table (408). The time zone name is sent to the application server (if required), or if needed by JavaScript or other code running at the client is provided to such code for use locally (410).

While four sample points are described above as being used in some embodiments, in other embodiments more or fewer sample points may be used. For example, in some embodiments, four sample points may not be deemed to be sufficient to differentiate between time zones that have nonstandard differences from adjacent or other time zones, for example due to atypical local rules regarding daylight savings time (DST), changes in DST as implemented locally through the years, etc. In such cases, a minimum number of samples sufficient to distinguish between time zones required to be identified uniquely and with precision is determined and used. For example, where historical changes in time zone approaches to DST or other rules may be important, one or more sample points that capture such differences and enable the approach described herein to be used to distinguish between time zones based on the determined offsets and representations thereof would be used.

While JavaScript and limitations thereof are mentioned above, techniques disclosed herein may be used in other environments in which a direct way to fetch a time zone name or other identifier of the client's local time zone may not be available, but offsets for sample points as described herein can be obtained.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of determining a time zone, comprising:
    receiving, at a client computer system, a table comprising mappings of key values to time zone identifiers, the table being received from a server, wherein the key values mapped to the time zone identifiers in the table comprise, as keys, hash values computed using a set of time offsets for each of the time zones associated with the server;
    determining, by the client computer system, a set of time offsets according to an offset between a system time and a reference time for each of a plurality of sample points, wherein the plurality of sample points comprise different date/time values;
    concatenating a plurality of time offsets included in the set of time offsets;
    computing a hash value of the concatenated plurality of time offsets;
    using the hash value as a key to look up, in the table, a time zone identifier associated with the client computer system; and
    communicating, by the client computer system, the time zone identifier associated with the client computer system to the server.

2. The method of claim 1, further comprising determining at the server a corresponding set of time offsets for each of a plurality of time zones associated with the server.

3. The method of claim 2, further comprising computing, by the server, a hash value for each of the sets of time offsets.

4. The method of claim 3, further comprising storing, by the server, for each of the time zones associated with the server, the corresponding hash value and associated identifiers respectively corresponding to the time zone.

5. The method of claim 1, further comprising downloading to the client computer system JavaScript or other code configured to cause the client computer system to determine the set of time offsets, to concatenate the plurality of time offsets, to compute the hash value, and to use the hash value as a key to look up, in the table received from the server, the time zone identifier associated with the client computer system.

6. The method of claim 1, further comprising providing the time zone identifier associated with the client computer system to a web or other application.

7. The method of claim 1, wherein the reference time comprises Coordinate Universal Time (UTC).

8. The method of claim 1, wherein the plurality of sample points includes four or more date/time values throughout the calendar year.

9. The method of claim 1, further comprising selecting one or more sample points to be included in the plurality of sample points based at least in part on a point of distinction between a first time zone and a second time zone.

10. The method of claim 9, wherein the point of distinction relates at least in part to an historical change in a manner in which one or more of the first time zone and the second time zone regulated time within the time zone.

11. The method of claim 9, wherein the point of distinction relates at least in part to an historical change in a manner in which one or more of the first time zone and the second time zone handled daylight savings time (DST) within the time zone.

12. The method of claim 1, further comprising caching the table to be used to look up the time zone identifier associated with the client computer system.

13. The method of claim 1, further comprising storing for future use the looked up time zone identifier associated with the client computer system.

14. A client computer system, comprising:
    a processor configured to:
    receive, at the client computer system, a table comprising mappings of key values to time zone identifiers, the table being received from a server, wherein the key values mapped to the time zone identifiers in the table comprise, as keys, hash values computed using a set of time offsets for each of the time zones associated with the server;

determine, by the client computer system, a set of time offsets according to an offset between a system time and a reference time for each of a plurality of sample points, wherein the plurality of sample points comprise different date/time values;
concatenate a plurality of time offsets included in the set of time offsets;
compute a hash value of the concatenated plurality of time offsets;
and use the hash value as a key to look up, in the table, a time zone identifier associated with the client computer system; and
communicate, by the client computer system, the time zone identifier associated with the client computer system to the server; and
a memory coupled to the processor and configured to store one or both of the set of time offsets and the hash value corresponding to the set of time offsets.

15. The client computer system of claim 14, wherein the memory is further configured to store the table to be used to look up the time zone identifier associated with the client computer system.

16. A tangible, non-transitory computer readable storage medium having encoded thereon computer instructions that, when executed by a processor perform the steps of:

receiving, at a client computer system, a table comprising mappings of key values to time zone identifiers, the table being received from a server, wherein the key values mapped to the time zone identifiers in the table comprise, as keys, hash values computed using a set of time offsets for each of the time zones associated with the server;
determining, by the client computer system, a set of time offsets according to an offset between a system time and a reference time for each of a plurality of sample points, wherein the plurality of sample points comprise different date/time values;
concatenating a plurality of time offsets included in the set of time offsets;
computing a hash value of the concatenated plurality of time offsets;
using the hash value as a key to look up, in the table, a time zone identifier associated with the client computer system; and
communicating, by the client computer system, the time zone identifier associated with the client computer system to the server.

* * * * *